No. 635,552. Patented Oct. 24, 1899.
M. KENNEDY.
COOK STOVE.
(Application filed Mar. 15, 1899.)

(No Model.)

WITNESSES:
L. Almquist
Isaac R. Owens

INVENTOR
Margaret Kennedy.
BY
ATTORNEYS.

UNITED STATES PATENT OFFICE.

MARGARET KENNEDY, OF FREDONIA, ILLINOIS.

COOK-STOVE.

SPECIFICATION forming part of Letters Patent No. 635,552, dated October 24, 1899.

Application filed March 15, 1899. Serial No. 709,186. (No model.)

*To all whom it may concern:*

Be it known that I, MARGARET KENNEDY, of Fredonia, in the county of Williamson and State of Illinois, have invented new and useful Improvements in Cook-Stoves, of which the following is a full, clear, and exact description.

The purpose of this invention is to provide a cook-stove which, while adapted both to baking and frying, may be so operated as to provide no more heat than is necessary to the work in hand, thus avoiding heating the oven when it is only desired to fry or boil. This end I attain by constructing the stove with two fire-boxes, over one of which the oven is arranged in a manner to gather from the fire-box all of the heat thereof, and over the other of which fire-boxes removable lids are placed, so that food may be fried and boiled thereon.
This specification is the disclosure of one form of my invention, while the claim defines the actual scope thereof.

Reference is to be had to the accompanying drawings, forming a part of this specification, in which similar characters of reference indicate corresponding parts in both views.

Figure 1:
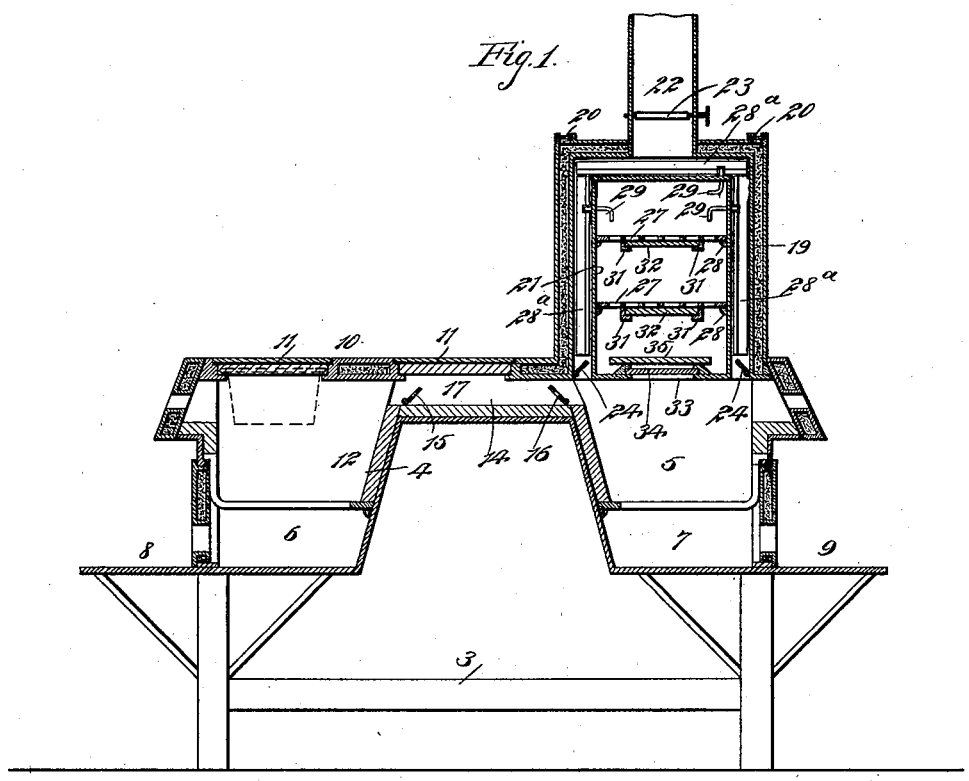
Figure 2:
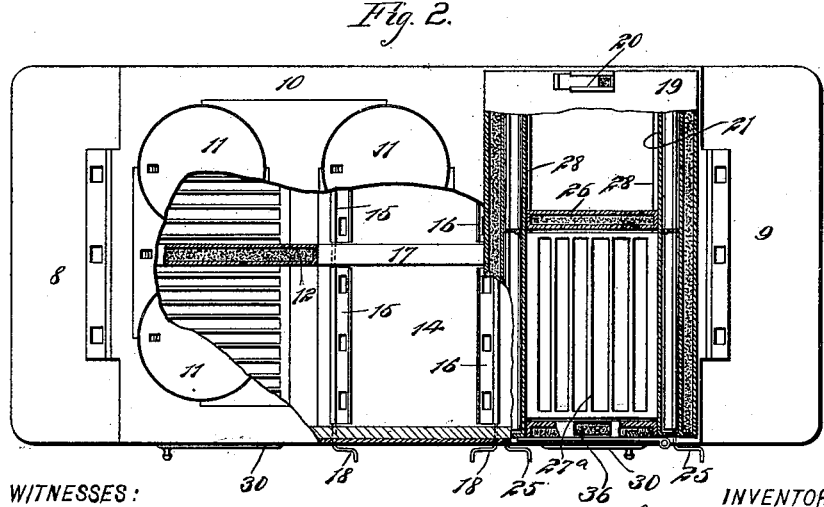

Figure 1 is a vertical section of the invention, and Fig. 2 is a partial horizontal section with parts broken away.

The stove is built on a suitable supporting-frame 3, and the two fire-boxes 4 and 5 of the stove are respectively provided with ash-pits 6 and 7 and ash-ledges 8 and 9. The fire-box 4 has the stove-top 10 arranged directly above it and provided with lids 11, as is usual in cooking stoves and ranges. If desired, the fire may be made to extend throughout the whole length of the fire-box 4; but if there is little cooking to do a partition 12 may be placed vertically in the fire-box 4, at the middle thereof, to divide the fire-box into two parts, one of which may be used to the exclusion of the other. A flue 14, leading the products of combustion from the fire-box 4, is provided with two dampers 15 at the end adjacent to the fire-box 4 and two dampers 16 at the other end. This flue 14 is also provided with a removable central partition 17, matching with the partition 12, and adapted to be used when the partition 12 is used, so as to divide the flue 14. The drawings show the removable partitions 12 and 17 in place, it being understood that these may be placed and displaced at will, according to the amount of cooking which is at hand. The partition 17 is arranged between the two dampers 15 and the two dampers 16, as shown best in Fig. 2. The dampers 15 and 16 are provided with suitable handles 18, extending out of the stove to permit the operation of the dampers, two of such handles being shown in Fig. 2.

Over the fire-box 5 an oven structure is erected, which structure consists of an outer casing or main portion 19, formed of two shells, between which is packed ashes, asbestos, or other non-combustible and non-heat-conducting substance. The top of the casing 19 is provided with sliding doors 20, commanding openings in the outer shell of the casing 19, through which openings the non-conducting material referred to may be passed. The oven has an inner casing 21, which forms the oven proper and which is separated from the casing 19 to form heat-circulating flues in communication with the fire-box 5 at their lower ends and with the smoke-pipe 22 at the top of the oven structure. A suitable damper 23 commands the pipe 22. The flues between the casing 21 and the casing 19 are commanded at their lower ends by means of dampers 24, provided with handles 25, extending outside of the stove to permit the manipulation of the dampers. The handles 25 are shown in Fig. 2. For the purpose of regulating the size of the oven I provide a removable partition 26 similar to the partition 12 and adapted to be fitted vertically in the oven-casing 21, as shown in Fig. 2. This partition divides the oven into two parts, and by its means the normally large oven may be reduced in size should the amount of baking on hand make such adjustment convenient. When the partition 26 is not in place, as shown in Fig. 1, dish-supporting gratings 27 are inserted in the oven, such gratings extending one above the other throughout the entire length of the oven and being supported on ledges 28, projecting inwardly from the casing 21. The ledges 28 are provided with notches in which the partition 26 may be fitted, as shown in Fig. 2. When the partition 26 is in place, short gratings 27ª are provided for the oven and are fitted therein at the front of the partition 26. The products of combustion from the fire-box 5 pass upwardly through the flues between the casings 19 and 21 and into the smoke-pipe 22. When the partition 26 is in place, it is necessary to divide the flues between the casings 19 and 21, thus cutting off the portions of the flues which are behind the partition 26, and therefore adjacent to the temporarily-unused portion of the oven. This is effected by means of three dampers 28ª, which are mounted between the casings 19 and 21 and which are provided with handles 29, extending into the oven, by means of which handles the dampers may be thrown to open or closed positions. The position of the partition 26 is determined by the notches in the ledges 28, and the smoke-pipe 22 is arranged forwardly of the point at which the partition 26 is located, so that when the partition is in place there is an unobstructed draft between the fire-box 5 and the smoke-pipe 22. It will thus be seen that the fire-boxes 4 and 5 may be used either simultaneously or separately. The draft from the fire-box 4 passes through the flue 14 and into the flues between the casings 19 and 21 and out by the smoke-pipe 22. The dampers 15, 16, 24, and 23 will control this draft from the fire-box 4. The draft from the fire-box 5 passes directly up between the casings 19 and 21 and out of the pipe 22. By means of this arrangement which I have provided the heat in the several fire-boxes is entirely utilized for the purpose of cooking, and very little of the heat escapes to be lost in the chimney, as in the case with stoves heretofore produced.

In order to hold the heat within the stove and to prevent its radiation, thus heating the surrounding apartment, which is very disadvantageous in warm weather, I provide the several parts of the stove with non-conducting outer walls, as shown in the drawings. These non-conducting walls may be constructed of any suitable material and may be made removable, so that should it be desired to heat the apartment from the stove the non-conducting walls may be replaced by the usual iron walls. The fire-boxes 4 and 5 are provided with doors 30, which open at the front of the stove, as shown in Fig. 2. All of the parts of the stove may, wherever desirable, be constructed of non-conducting material in the manner and for the purpose explained above.

The grates 27 are provided on their under sides with guideways 31, in which asbestos plates 32 may be removably held, whereby to shield the dishes on the grates from the heat of the fire-box should it be necessary to partly arrest the cooking of the food. The bottom of the casing 21 is provided with an opening 33 therein, which is normally closed by a removable lid 34. A heat radiating and distributing plate 35 is removably mounted on the bottom of the casing 21 to cover the lid 34. By these means the heat radiating from the bottom of the casing 21 is effectively distributed throughout the oven. If desired, the plate 35 and lid 34 may be removed, thus exposing the glowing coals and the fire-box 5, which permits the oven to be used for the purpose of broiling food. The oven is provided at its front side with a door 36, by which access may be had to the oven.

Various changes in the form, proportions, and minor details of my invention may be resorted to without departing from the spirit and scope of my invention. Hence I consider myself entitled to all such variations as may lie within the scope of my claim.

Having thus described my invention, I claim as new and desire to secure by Letters Patent—

A stove, having two fire-boxes connected by a flue, one of the fire-boxes having a flat top, an oven situated directly over the second fire-box formed in the top thereof and having double walls forming flues communicating directly with the second fire-box and leading from the same, and a smoke-pipe passing from the flues of the oven.

MARGARET KENNEDY.

Witnesses:
L. WATSON,
R. W. HOPPER.